US012594941B2

(12) United States Patent (10) Patent No.: US 12,594,941 B2
Flumm et al. (45) Date of Patent: Apr. 7, 2026

(54) SYSTEM AND METHOD FOR EVALUATING THE BEHAVIOR OF A VEHICLE COMPONENT

(71) Applicant: Knorr-Bremse Systeme Fuer Nutzfahrzeuge GmbH, Munich (DE)

(72) Inventors: Simon Flumm, Wiernsheim (DE); Peter Graf, Esslingen a. N. (DE); Kaan Albayrak, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 222 days.

(21) Appl. No.: 17/785,156

(22) PCT Filed: Dec. 29, 2020

(86) PCT No.: PCT/EP2020/087993
§ 371 (c)(1),
(2) Date: Jun. 14, 2022

(87) PCT Pub. No.: WO2021/140048
PCT Pub. Date: Jul. 15, 2021

(65) Prior Publication Data
US 2023/0023884 A1 Jan. 26, 2023

(30) Foreign Application Priority Data

Jan. 8, 2020 (DE) ..................... 10 2020 100 225.4

(51) Int. Cl.
*B60W 30/184* (2012.01)
*B60T 17/22* (2006.01)
(Continued)

(52) U.S. Cl.
CPC ........... *B60W 30/184* (2013.01); *B60T 17/22* (2013.01); *B60W 10/04* (2013.01); *B60W 10/18* (2013.01);
(Continued)

(58) Field of Classification Search
CPC .... B60W 30/184; B60W 10/04; B60W 10/18; B60W 10/20; B60W 2520/00; B60T 17/22; B60T 2250/00; B60T 17/221
(Continued)

(56) References Cited

U.S. PATENT DOCUMENTS

| | | | |
|---|---|---|---|
| 10,395,444 | B1 | 8/2019 | Edren et al. |
| 2003/0216889 | A1 | 11/2003 | Marko et al. |

(Continued)

FOREIGN PATENT DOCUMENTS

| | | |
|---|---|---|
| CN | 1611751 A | 5/2005 |
| CN | 102381298 A | 3/2012 |

(Continued)

OTHER PUBLICATIONS

International Search Report for PCT/EP2020/087993 Issued Mar. 30, 2021.
(Continued)

*Primary Examiner* — Navid Z. Mehdizadeh
*Assistant Examiner* — Oliver Tan
(74) *Attorney, Agent, or Firm* — NORTON ROSE FULBRIGHT US LLP

(57) ABSTRACT

A method for evaluating the behavior of a vehicle component, including: issuing a control signal by a control unit of a motor vehicle to a vehicle component; detecting a response of the motor vehicle to the control signal; determining the behavior of the vehicle component; classifying the behavior
(Continued)

of the vehicle component; and adapting the actuation of the motor vehicle component by the control unit. Also described is a related system.

15 Claims, 1 Drawing Sheet

(51) Int. Cl.
    *B60W 10/04*        (2006.01)
    *B60W 10/18*        (2012.01)
    *B60W 10/20*        (2006.01)

(52) U.S. Cl.
    CPC .......... *B60W 10/20* (2013.01); *B60T 2250/00*
        (2013.01); *B60W 2520/00* (2013.01)

(58) Field of Classification Search
    USPC .......................................................... 701/41
    See application file for complete search history.

(56)           References Cited

U.S. PATENT DOCUMENTS

| | | | | |
|---|---|---|---|---|
| 2004/0162650 | A1* | 8/2004 | Kueperkoch ........... | B60T 8/885 |
| | | | | 701/29.2 |
| 2004/0167678 | A1* | 8/2004 | Frank .................... | B60T 8/1755 |
| | | | | 701/1 |
| 2005/0138917 | A1* | 6/2005 | Maki ..................... | F01N 11/007 |
| | | | | 60/277 |
| 2012/0044066 | A1 | 2/2012 | Vauderer et al. | |
| 2014/0365078 | A1* | 12/2014 | Gerecke ................. | B62D 7/159 |
| | | | | 701/41 |
| 2016/0031321 | A1* | 2/2016 | Ono ..................... | G06V 20/597 |
| | | | | 701/41 |
| 2016/0053839 | A1 | 2/2016 | Putz | |
| 2017/0349185 | A1* | 12/2017 | McNew ................... | G05B 9/02 |
| 2018/0197355 | A1* | 7/2018 | Remboski ............ | G07C 5/0808 |
| 2019/0155289 | A1 | 5/2019 | McNeil et al. | |
| 2019/0168722 | A1* | 6/2019 | Schroeder ................. | B60T 7/22 |
| 2019/0371093 | A1 | 12/2019 | Edren et al. | |
| 2020/0023859 | A1* | 1/2020 | Schmitt ............... | B60W 50/029 |
| 2020/0104881 | A1* | 4/2020 | Yasui ..................... | G06V 40/19 |
| 2020/0180611 | A1* | 6/2020 | Klingemann ......... | B60W 50/14 |

FOREIGN PATENT DOCUMENTS

| | | | | | |
|---|---|---|---|---|---|
| CN | 103339009 | A | 10/2013 | | |
| CN | 104700468 | A | 6/2015 | | |
| CN | 106103216 | A | 11/2016 | | |
| CN | 107107930 | A | 8/2017 | | |
| DE | 10148534 | A1 | 4/2003 | | |
| DE | 10319493 | A1 | 11/2003 | | |
| DE | 102008049754 | A1 | 4/2010 | | |
| DE | 102013007007 | A1 | 10/2014 | | |
| DE | 102014008490 | A1 | 11/2014 | | |
| DE | 202013007358 | U1 | 11/2014 | | |
| DE | 102014006319 | A1 | 11/2015 | | |
| DE | 102017220327 | A1 | * | 5/2019 | ........ B60W 50/0205 |
| EP | 0800976 | A1 | 10/1997 | | |
| EP | 0563596 | B1 | 7/1998 | | |
| EP | 0894685 | A2 | 2/1999 | | |
| EP | 1548256 | A1 | 6/2005 | | |
| EP | 3644148 | A1 | 4/2020 | | |
| WO | 03080415 | A1 | 10/2003 | | |
| WO | 2015058119 | A2 | 4/2015 | | |

OTHER PUBLICATIONS

"Common Knowledge General Proof 1, Driver Education Handbook," Xiao Changsheng Ed., Hubei Science & Technology Publishing (2011), including English abstract.

"Common General Knowledge Proof 2, Micro-car Practical Repair Compendium," Xu Xiao Ed., 1995, University of Electronics Technology Publishing, including English abstract.

"Common General Knowledge Proof 3, Automotive Operation Performance Technology" By Hiro Ozawa Ma Ning, Trans. (2018) Machine Industry Publishing, including English abstract.

"Fahrdynamikregelung (Vehicle Dynamics Control)," Wikipedia article (2019); pp. 1-4 with English translation of first paragraph.

"Antiblockiersystem (Anti-lock braking system)," Wikipedia article (2019), pp. 1-10 with English translation of first paragraph.

Winner et al. "Hanbuch Fahrerassistenz-systeme (Driver Assistance Systems Manual)," Vieweg + Teubner (2009); pp. 363-381.

* cited by examiner

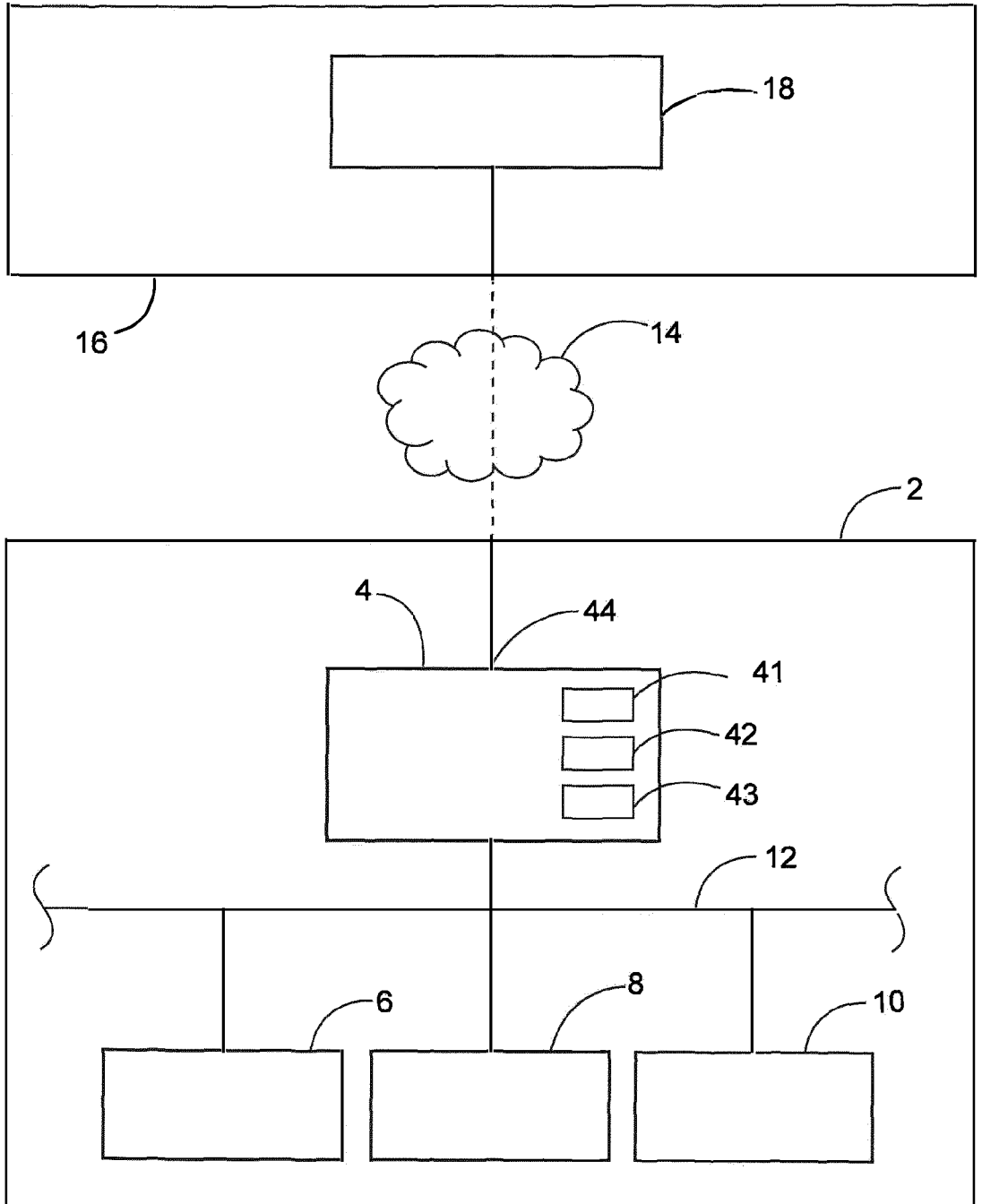

SYSTEM AND METHOD FOR EVALUATING THE BEHAVIOR OF A VEHICLE COMPONENT

FIELD OF THE INVENTION

The present invention relates to a device and a method for evaluating the behavior of vehicle components and relates in particular to such a device and such a method for evaluating vehicle component behaviors that change as a result of wear.

BACKGROUND INFORMATION

In medium to long-term operation, vehicle components are subject to wear-related changes. This leads to a vehicle behavior which in general is not constant. For example, wear on brake pads can increase the air gap between the brake disk and the brake shoe, resulting in an extended dead time, i.e. an increase in the length of time from the output of the brake signal until the brake becomes effective. Likewise, for example, the wear on a brake disk can reduce the overall braking power, or wear in a drive system can reduce the drive power.

In manual driving operation, a human driver will compensate for this unknown behavior in their role as the driver of the vehicle and will adapt their vehicle control behavior to the current vehicle condition.

In assisted driving, on the other hand, the control unit is often specially adapted to specific characteristics of the target system and thus adapted to a specific behavior of the vehicle component. If a change occurs in the behavior of vehicle components or their condition, the system cannot react to this, or only to a limited extent.

Up to now, for example, in the evaluation of vehicle behavior in a platooning context the influence of individual components in a vehicle has either not been included, or only to a limited extent, but instead the focus has been on the overall vehicle behavior. The focus of the present invention disclosure extends the evaluation of a vehicle network to include individual systems and components.

SUMMARY OF THE INVENTION

An object of the invention is to eliminate the disadvantages from the prior art and to present a teaching which allows automatic operation of a motor vehicle with altered vehicle component behavior due to wear.

This object may be achieved by a method as described herein and a system a as described herein. Advantageous refinements are the subject matter of the further exemplary embodiments.

A method for evaluating vehicle component behavior is disclosed that comprises the following steps: issuing a control signal by a control unit of a motor vehicle to a vehicle component, detecting a response of the motor vehicle to the control signal, determining the behavior of the vehicle component, classifying the behavior of the vehicle component, adapting the actuation of the motor vehicle component by the control unit. This allows the control process to be adapted to an altered vehicle component behavior.

It is also disclosed that the detection step, the determination step, and the classification step are carried out by the control unit.

It is also disclosed that the detection of a response is an acceleration detection, a rotation detection or a tilt detection, and the control signal is a steering intervention signal to a steering system, a brake signal to a brake system, or a drive signal to a drive system.

It is further disclosed that the method also comprises the steps: transmitting the detected response of the motor vehicle in the form of information via a data transmission network to an external information system with a processing unit, the determination step and the classification step being carried out by the processing unit, and transmitting information about the classified vehicle component behavior to the control unit via the data transmission network.

It is also disclosed that the vehicle component behavior is a dead time, a braking power, a steering power, or a drive power.

Also disclosed is a system for evaluating the behavior of a vehicle component, comprising: a vehicle having: a control unit with at least one sensor for detecting vehicle behavior and at least one controlled vehicle component, the system being configured to carry out the method as claimed in any one of the previously disclosed method aspects.

It is also disclosed that the at least one controlled vehicle component is a steering system, a brake system, or a drive system.

It is also disclosed that the at least one sensor is an acceleration sensor, a rotation sensor, or a tilt sensor.

It is also disclosed that the system further comprises: an external information system having a data processing unit, and a data network interface via which a communication link can be established to the external information system using the processing unit.

The aim of the invention is to analyze the initially unknown behavior of one or more systems and individual components in a vehicle or vehicle network and to evaluate its behavior and condition. This can be carried out by passive monitoring or active response to the input variables into the system or into a component and detecting the vehicle response, e.g. by sensors or output variables supplied on a data link.

With the aid of the evaluated condition and the evaluated behavior, an optimization can be carried out by control algorithms either once only or continuously in order to take into account, for example, a dead time behavior of a brake system, a drive train and/or a steering system.

With the aid of the evaluated condition and the evaluated behavior, an evaluation can be made as to wear phenomena and/or malfunctions, e.g. due to a reduced vehicle deceleration under constant external influences. Based on this evaluation, information, instructions, warnings and alarms can be generated, which can be further processed in the vehicle itself or on an external information system.

With the aid of the evaluated condition and the evaluated behavior, for example by a long-term observation, information can be generated about favorable or unfavorable vehicle configurations. With the aid of an external information system, which can be connected e.g. via an internet connection, different vehicle configurations can then be compared and information for future developments can be generated from this. For example, via the interaction of the steering and brake systems from different manufacturers, which have a significant influence on the longitudinal and transverse guidance behavior of the vehicle.

The invention will be described in further detail below based on the FIGURE.

BRIEF DESCRIPTION OF THE DRAWING

FIG. 1 shows a schematic illustration of a system according to the invention for evaluating the behavior of a vehicle component.

DETAILED DESCRIPTION

Using FIG. 1, the following describes a first exemplary embodiment of a system according to the invention for evaluating the behavior of a vehicle component.

A motor vehicle 2, for example a heavy goods vehicle, is equipped with an electronic control unit (ECU) 4 and vehicle components such as a steering system 6, a brake system 8 and a drive system 10. The electronic control unit 4 is connected to the steering system 6, the brake system 8 and the drive system 10 via one or more data connections 12. In the exemplary embodiment, the data connection 12 is implemented using a CAN bus.

The control unit 4 has sensors, such as one or more acceleration sensors 41, which can be used to detect longitudinal and transverse accelerations of the motor vehicle 2, a rotation sensor 42 which can be used to detect rotations of the motor vehicle 1 about the longitudinal, transverse or vertical axes, and tilt sensors 43 which can be used to detect a vehicle tilt. The steering system 6, brake system 8 and drive system 10 can be controlled via the data connection 12, for example a brake signal can be transmitted to the brake system 8. Alternatively, the control unit 4 receives the data from external sensors connected via a data line.

If the control unit 4 now outputs a control signal to a vehicle component, for example a steering signal to the steering system 6, a brake signal to the brake system 8, or a power change signal to the drive system 10, the control unit uses its sensors 41, 42, 43 to detect the response of the motor vehicle 1, for example a transverse acceleration, a rotation about the vertical axis or a tilt caused by a steering intervention, a negative longitudinal acceleration due to a braking engagement, or a positive longitudinal acceleration due to a drive engagement. This allows the control unit 4 to determine vehicle component behaviors, such as a dead time of the vehicle component, i.e. the time from the control signal being output until the vehicle component becomes effective, a braking power or a drive power. These behaviors are determined upon each control signal output, so that a change in the vehicle component behavior over time can be detected by statistical algorithms, for example, and the vehicle component behavior can be evaluated and classified, for example, by algorithms based on artificial intelligence.

The change in vehicle component behaviors caused by wear generally has an influence on the control performance, for example, of an automatic or autonomous control of the motor vehicle. By detecting the change in vehicle component behavior, the actuation of the vehicle components can be adapted to the changes they undergo and thus the control performance can be improved, which can result in increased safety and increased comfort.

In a variation of the first exemplary embodiment, the control unit 4 has a data network interface 44, in particular a wide-area data network interface, such as a GSM module, a UMTS module, or a LTE module. The wide-area data network interface 44 enables a connection to a remote information system 16 with a data processing unit 18 via a wide-area data network 14, for example the internet. The control signals issued by the control unit 4, together with the sensor information acquired, are transmitted via the wide-area data network to the remote information system 16 and are detected, evaluated and classified by the data processing unit 18 instead of by the control unit 4. The evaluated and classified data are then transmitted back to the control unit via the wide-area data network 14 and the control unit adapts the actuation of the vehicle components according to the classification. By relocating the detection, evaluation and classification from the control unit 4 to the data processing unit 18, the computationally intensive loading on the control unit can be reduced and hence it can be dimensioned with lower computational power, or any overloading can be prevented.

The exemplary embodiment is only provided as an exemplary configuration of the invention as and does not represent a limitation of the invention. Within the scope of the protection of the claims, configurations which can deviate from the exemplary embodiment will be apparent to the person skilled in the art.

Thus in the exemplary embodiment, the control unit is equipped with the sensors 41, 42 43. Alternatively, the sensors 41, 42, 43 can also be connected to the control unit and read out via the data connection 12. Alternatively, the sensors can also be provided in the vehicle components such as the steering system 6, brake system 8 or drive system 10 and can be read out by the control unit 4.

The exemplary embodiment relates to a motor vehicle 2. Alternatively, the system can detect, evaluate, and classify component behaviors of vehicle components of a vehicle network.

In the exemplary embodiment, the detection, evaluation, and classification is carried out when each control signal is issued by the control unit. Alternatively, the detection, evaluation and classification can be carried out at longer intervals, for example every hundredth control signal output, or at fixed time intervals such as once per hour, or when the control signal meets certain criteria, such as a control operation exceeding a specific significance.

In the exemplary embodiment, the control unit 4 comprises the data network interface 44. Alternatively, the data network interface 44 can be part of a vehicle component such as the steering system 6, brake system 8, or drive system 10, or of another control unit connected to the control unit 4 via the data connection 12.

In the exemplary embodiment, certain data connections such as a CAN bus or a GSM, UMTS or LTE connection have been cited. Any other technology considered suitable by the person skilled in the art can also be used here.

In the description, the terms "and", "or" and "either . . . or" are used as a connective in the sense of the logical conjunction (mathematical AND), as a connective in the sense of the logical adjunction (mathematical OR, often also "and/or"), or as a connective in the sense of the logical non-equivalence (mathematical exclusive OR).

The method steps specified in the description or claims serve only to list the necessary method steps. They only imply an order where the order is explicitly stated or where it is deemed necessary for the person skilled in the art. In particular, the list does not imply an exhaustive listing.

THE LIST OF REFERENCE SIGNS IS AS FOLLOWS

1, 2 motor vehicle, heavy goods vehicle
4 electronic control unit
6 steering system 8 brake system
10 drive system
12 data connection
14 wide-area data network
16 remote information system
28 data processing unit
41 acceleration sensor
42 rotation sensor
43 tilt sensor
44 wide-area data network interface

The invention claimed is:

1. A method for evaluating a behavior of a vehicle component of a vehicle, the method comprising:

issuing a control signal by a control unit of the vehicle to the vehicle component, wherein the vehicle component is a steering system or a brake system, and wherein the control signal is a steering intervention signal to the steering system or a brake signal to the brake system;

detecting a response of the vehicle component and the vehicle to the control signal;

determining the behavior of the vehicle component based on the detected response to the issued control signal, the determined behavior being a dead time, the dead time being a length of time from when the control signal was issued to the vehicle component until a time when the vehicle component became effective in response to the issued control signal;

classifying the determined behavior of the vehicle component; and adapting an actuation of the vehicle component by the control unit based on a result of the classifying;

wherein the vehicle component is a brake system of the vehicle or a steering system of the vehicle, wherein the behavior of the vehicle component changes as a result of wear to the vehicle component, and wherein the wear influences control performance of an automatic or autonomous control of the vehicle, and wherein the actuation of the vehicle component is adapted to the changes in the behavior of the vehicle component to improve the control performance of the vehicle component.

2. The method of claim 1, wherein the detecting, the determining and the classifying are carried out by the control unit.

3. The method of claim 1, wherein the detecting of the response includes an acceleration detection, a rotation detection, or a tilt detection.

4. The method of claim 1, further comprising:

transmitting the detected response of the vehicle in the form of information via a data transmission network to an external information system having a processing unit, the determining and the classifying being carried out by the processing unit; and transmitting information about the classified vehicle component behavior to the control unit via the data transmission network.

5. The method of claim 1, wherein the vehicle component is the steering system, the control signal is the steering intervention signal, and the detecting of the response includes detecting a rotation of the vehicle caused by a steering intervention or a tilt of the vehicle caused by the steering intervention.

6. The method of claim 1, wherein the vehicle component is the braking system, the control signal is the brake signal to the brake system, and the detecting of the response include detecting a negative longitudinal acceleration caused due to a braking engagement.

7. A system for evaluating a behavior of a vehicle component of a vehicle, comprising:

a control unit;

at least one sensor for detecting a behavior of the vehicle and the vehicle component; and the vehicle component, which is controlled;

wherein the control unit is configured to perform the following:

issuing a control signal by the control unit of the vehicle to the vehicle component, wherein the vehicle component is a steering system or a brake system, and wherein the control signal is a steering intervention signal to the steering system or a brake signal to the brake system;

detecting a response of the vehicle to the control signal;

determining the behavior of the vehicle component based on the detected response to the issued control signal, the determined behavior being a dead time, the dead time being a length of time from when the control signal was issued to the vehicle component until a time when the vehicle component became effective in response to the issued control signal;

classifying the detected behavior of the vehicle component; and adapting an actuation of the vehicle component by the control unit;

wherein the vehicle component is a brake system of the vehicle or a steering system of the vehicle, wherein the behavior of the vehicle component changes as a result of wear to the vehicle component, and wherein the wear influences control performance of an automatic or autonomous control of the vehicle, and wherein the actuation of the vehicle component is adapted to the changes in the behavior of the vehicle component to improve the control performance of the vehicle component.

8. The system of claim 7, wherein the at least one sensor includes the control unit or the at least one controlled vehicle component, or is a separate component or integral part of another component which is connected to the control unit via a data connection.

9. The system of claim 7, wherein the at least one sensor includes an acceleration sensor, or a rotation sensor, or a tilt sensor.

10. The system of claim 7, further comprising:

an external information system having a data processing unit; and a data network interface, via which a communication link is establishable to the external information system using the processing unit.

11. The system of claim 10, wherein the data network interface includes the control unit or is a separate component or integral part of another component which is connected to the control unit via a data connection.

12. The system of claim 7, wherein the vehicle component is the steering system, the control signal is the steering intervention signal, and the detecting of the response includes detecting a rotation of the vehicle caused by a steering intervention or a tilt of the vehicle caused by the steering intervention.

13. The system of claim 7, wherein the vehicle component is the braking system, the control signal is the brake signal to the brake system, and the detecting of the response include detecting a negative longitudinal acceleration caused due to a braking engagement.

14. A method for evaluating a behavior of a vehicle component of a vehicle, the method comprising:

issuing a control signal by a control unit of the vehicle to the vehicle component, wherein the vehicle component is a steering system or a brake system, and wherein the control signal is a steering intervention signal to the steering system or a brake signal to the brake system;

detecting a response of the vehicle component and the vehicle to the control signal;

determining the behavior of the vehicle component based on the detected response to the issued control signal, the determined behavior being a dead time, the dead time being a length of time from when the control signal was issued to the vehicle component until a time when the vehicle component became effective in response to the issued control signal;

classifying the determined behavior of the vehicle component; and adapting an actuation of the vehicle component by the control unit based on a result of the classifying.

15. The method of claim 14, wherein the vehicle component is the steering system, the control signal is the steering intervention signal, and the detecting of the response includes detecting a rotation of the vehicle caused by a steering intervention or a tilt of the vehicle caused by the steering intervention.

* * * * *